United States Patent

Klein

[15] 3,659,328

[45] May 2, 1972

[54] STRIPPING AND CRIMPING APPARATUS

[72] Inventor: Avigdor Klein, Highland Park, N.J.

[73] Assignee: Thomas & Betts Corporation, Elizabeth, N.J.

[22] Filed: Aug. 17, 1970

[21] Appl. No.: 64,516

[52] U.S. Cl. ..........................................29/203 D, 29/203 P

[51] Int. Cl..........................................................H01r 43/04

[58] Field of Search...........29/203 D, 630 A, 203 DT, 203 P; 81/9.51

[56] References Cited

UNITED STATES PATENTS

| | | | |
|---|---|---|---|
| 3,086,282 | 4/1963 | Cootes | 29/630 A |
| 3,339,719 | 9/1967 | Bush | 206/56 |
| 3,376,627 | 4/1968 | Sitz | 81/9.51 |

*Primary Examiner*—Thomas H. Eager

*Attorney*—David Teschner and Jesse Woldman

[57] ABSTRACT

The invention is directed to an improved, compact, pneumatically actuated semi-automatic stripping and crimping apparatus having means for transferring a stripped conductor in a single, direct linear path from a stripping zone to a crimping zone. Adjustable crimping means comprising a pair of releasable die members is disposed in direct linear alignment forward of the stripping zone. Wire holding and transfer means, disposed adjacent stripping means which is planarly rotatable away from the stripping zone, is reciprocatingly displaceable in a direct linear unobstructed path between the stripping zone and the crimping zone. Terminal feed means comprising a channel-like terminal guide member and a reciprocating, resiliently mounted pawl is provided to intermittently advance a plurality of conductor terminating connectors selectively disposed on a tape carrier towards and into the crimping zone.

23 Claims, 16 Drawing Figures

INVENTOR.
AVIGDOR KLEIN
BY Jesse Waldman
AGENT

STRIPPING AND CRIMPING APPARATUS

CROSS-REFERENCE TO COPENDING APPLICATION

Reference is herein made to copending application Ser. No. 57,570, filed July 23, 1970 for a Stripping Apparatus by Harold Jesse Bush and assigned to the assignee of the instant invention.

BACKGROUND OF THE INVENTION

1. Field of the Invention

The invention is directed to the field of semi-automatic stripping and crimping apparatus and principally to a conductor insulation stripping and terminal applying apparatus.

2. Description of the Prior Art

Wire stripping and crimping apparatus according to the prior art, and in one form as exemplified in U.S. Pat. No. 3,376,627 granted to Gilbert C. Sitz on Apr. 9, 1968, and assigned to AMP Incorporated, generally comprised intricate and expensive wire holding and transfer means rotatably and slidably movable from a stripping zone to an adjacent terminal applying zone in essentially a two-stage transfer operation in order to adequately clear the stripper blades and permit the subsequent transfer of the stripped wire to the crimping station. Another form of wire stripping and crimping apparatus, as shown for example in U.S. Pat. No. 3,086,282 granted to H. E. Cootes et al on Apr. 23, 1963, and assigned to AMP Incorporated, utilized a generally complex rotary motion wire holding and transfer means to advance an insulated conductor from the stripping zone to the crimping zone. Additionally, such prior art apparatus was bulky, difficult to maintain, and required frequent readjustment and alignment in an attempt to insure the proper functioning thereof.

SUMMARY OF THE INVENTION

The invention is directed to an improved wire stripping and crimping apparatus which overcomes the problems noted above with respect to prior art devices by providing a compact, semi-automatic pneumatically operated direct linear transfer apparatus for advancing a stripped wire from a stripping zone to a terminal applying zone that is simpler, less expensive and more accurate than such devices. Coupled to a reciprocatingly movable first slide member adjacent a stripping zone is a pneumatically actuated wire holding device comprising a pair of appropriately contoured jaws adapted to securely engage and retain therein a predetermined length of insulated wire. In direct longitudinal alignment with the forward end of the wire holding jaws is a pair of laterally operable stripper blades each cooperably engageable with an associated first end of a pair of cam operated arm members pivotally coupled to a second slide member rotatable towards and away from the stripping zone. A pair of cam engaging means each coupled to an associated second end of said arm members operatively engage a selectively contoured cam portion of a reciprocating third slide member arranged to laterally displace the cam engaging means and urge the second slide member towards and away from the stripping zone. Crimping means comprising a head portion, a ram portion, and a pair of releasable die members therebetween is disposed forward of the wire holding jaws and in direct linear alignment therewith. Coupled to the head portion of the crimping means is a wire guide member having a generally frusto-conical aperture longitudinally aligned with the wire holding means and adapted to accurately direct the stripped end of an insulated wire inserted therein into the wire receiving portion of a terminal or similar device selectively disposed in a crimping zone directly adjacent the crimping means. Coupled to the ram portion of the crimping means is an hydraulic actuating means operable from a dual-pressure source selectively responsive to the position of the wire holding means to provide a predetermined first holding force and a second crimping force to the crimping means. Adjacent the crimping means and providing a support therefore is a pair of overlapping, slidably coupled plate members adjustable in three mutually perpendicular directions for aligning the crimping means relative to the wire holding jaws. Tape feed means for advancing a supply of terminals releasably disposed in spaced relationship upon a selectively apertured tape carrier and comprising a channel-like tape support member and a spring biased reciprocatingly actuated pawl is provided for intermittently feeding said terminals towards and into a crimping zone. A pair of cover members are disposed intermediate the upstanding sides of the tape support member and are pivotally coupled to one of said sides whereby a portion of the tape carrier may be conveniently loaded laterally into the support channel, thereby precluding the necessity for tediously advancing the tape longitudinally therethrough during such loading operation. It is therefore an object of this invention to provide an improved wire stripping and crimping apparatus.

It is a further object of this invention to provide an improved semi-automatic, pneumatically operated wire stripping and crimping apparatus.

It is another object of this invention to provide an improved wire stripping and crimping apparatus having a crimping zone in direct, spaced, unobstructed linear alignment with a stripping zone.

It is still a further object of this invention to provide an improved wire stripping and crimping apparatus permitting the advance of a stripped wire in a single, unobstructed linear path from a stripping zone to a crimping zone.

It is yet another object of this invention to provide an improved wire stripping and crimping apparatus for stripping a predetermined portion of insulation from an insulated conductor in a crimping zone, advancing the conductor in a single, direct, unobstructed linear path to a crimping zone and applying to the stripped end thereof, one of a plurality of connectors intermittently advanced towards said crimping zone from a source adjacent thereto.

Other objects and features of the invention will be pointed out in the following description and claims and illustrated in the accompanying drawings, which disclose, by way of example, the principle of the invention and the best mode which has been contemplated for carrying it out.

BRIEF DESCRIPTION OF THE DRAWINGS

In the drawings.

Similar elements are given similar reference characters in each of the respective drawings.

DESCRIPTION OF THE PREFERRED EMBODIMENTS

Figure 1:
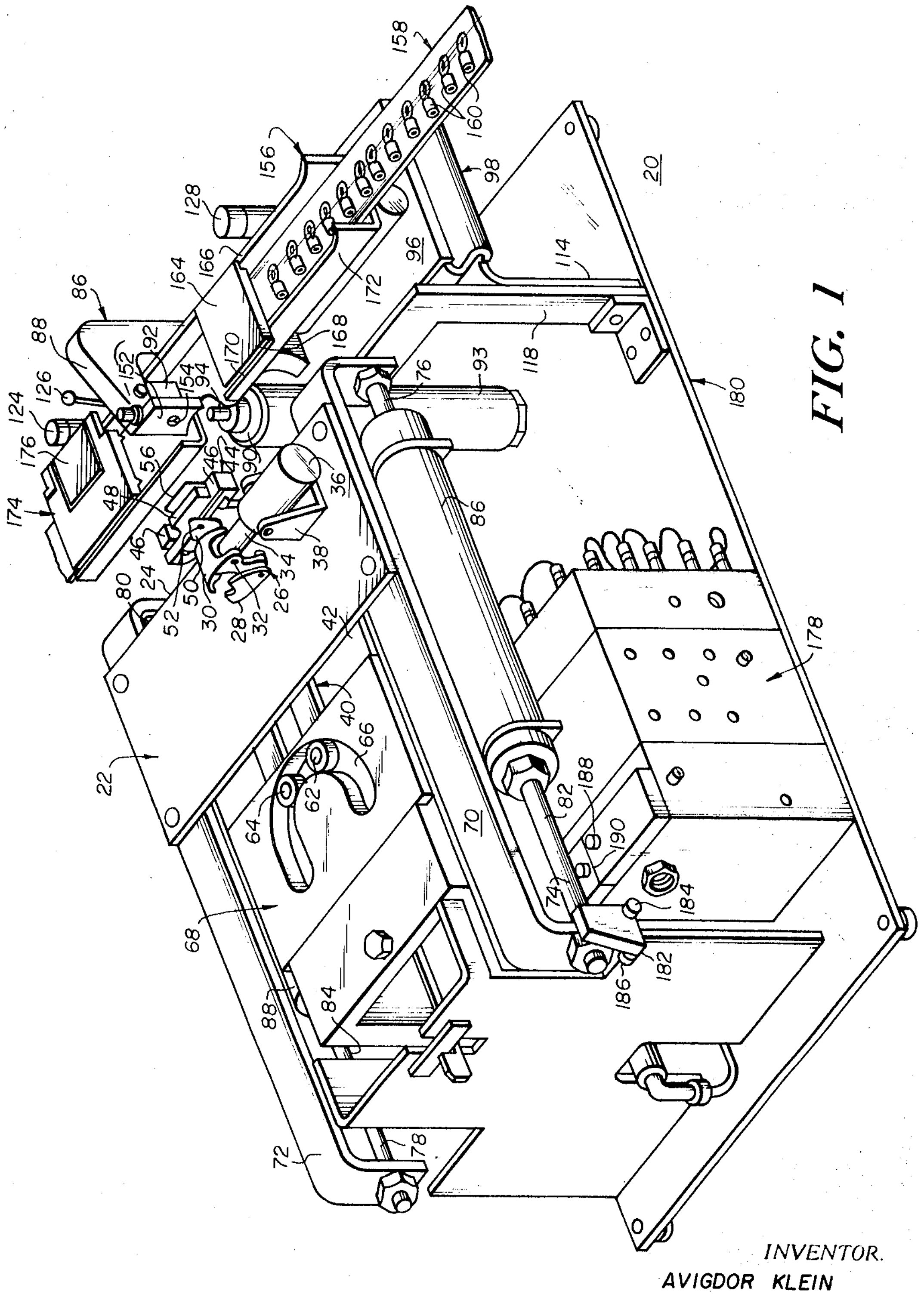
FIG. 1 is a perspective view of a wire stripping and crimping apparatus constructed in accordance with the concepts of the invention.
Figure 2:
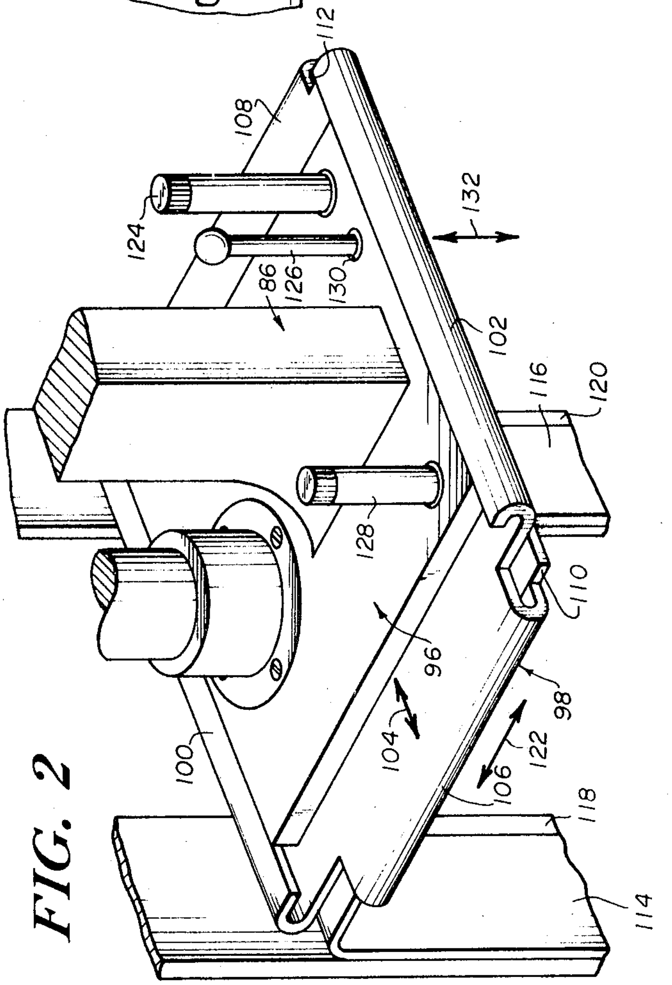
FIG. 2 is a perspective view, partly in section, of an adjustable crimping means support member of the apparatus of FIG. 1.
Figure 12:
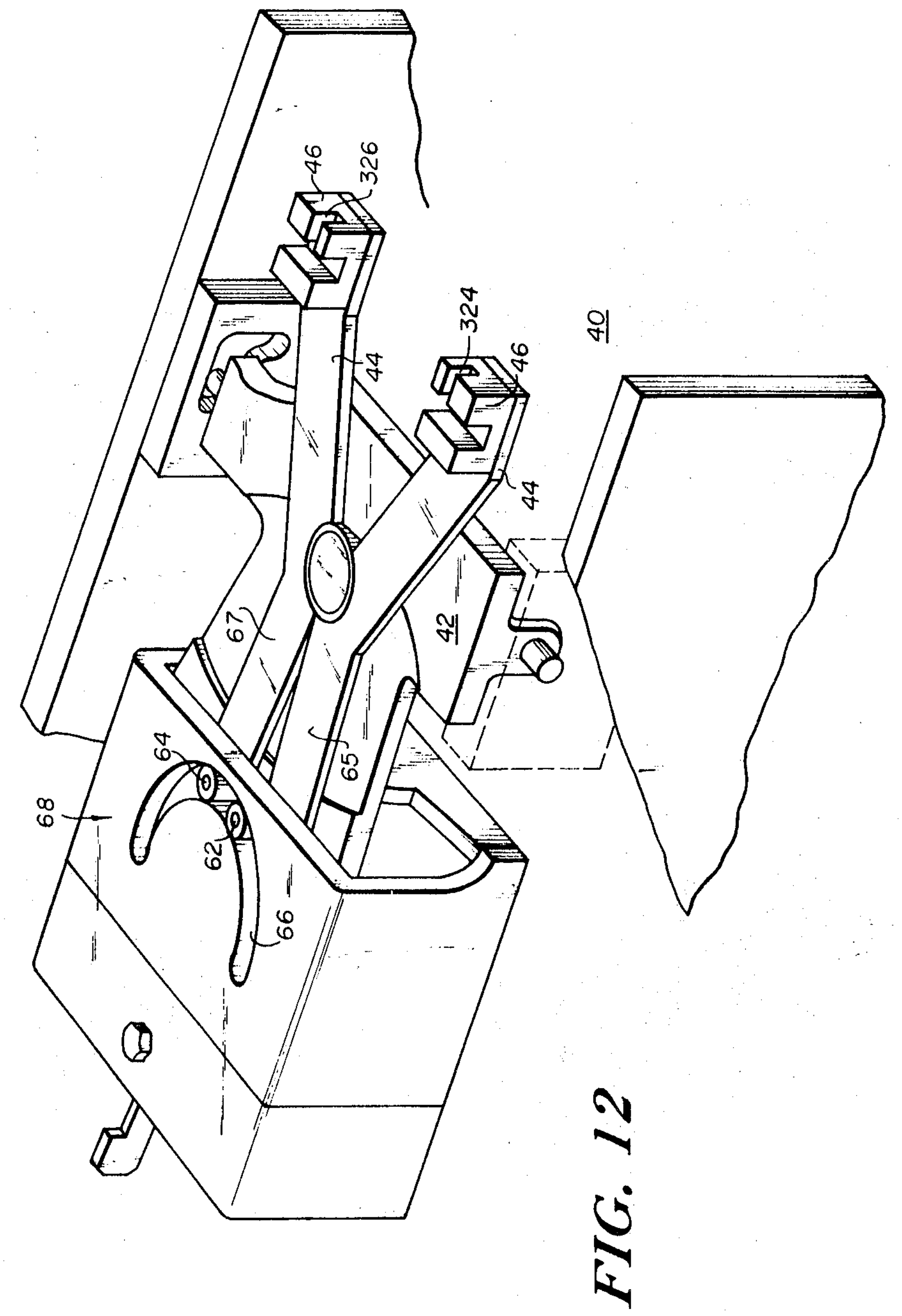
FIG. 12 is a perspective view of a portion of the stripping means of FIG. 1.

Turning now to FIG. 1, there is shown an improved wire stripping and crimping apparatus 20 constructed in accordance with the concepts of the invention. Coupled to a first slide member 22 adjacent the forward end 24 thereof is a wire holding means 26 comprising a lower jaw 28 affixed to slide member 22 and a movable upper jaw 30 cooperably engageable therewith and arranged to intermesh with the lower jaw 28 to rigidly secure a predetermined length of insulated wire (not shown) between jaws 28 and 30. Rotatably coupled to upper jaw 30 by means of pin 32 is a piston 34 slidably coupled to a pneumatic cylinder 36, forming the actuating means for wire holding means 26. Bracket 38 serves to pivotally support cylinder 36 on the first slide member 22. Directly beneath first slide member 22 is a wire insulation stripping mechanism 40 (partly visible in FIG. 1 and more fully shown in FIG. 12) pivotally coupled to a second slide member 42 and to be more fully described below. Movably coupled to the first end 44 of stripping mechanism 40 is a pair of selectively slotted members 46 for positionally retaining therebetween a blade holder 48, the details of which are more fully shown in FIG. 15. Intermediate the ends of blade holder 48 is an appropriately apertured concave portion 50 having a converging aperture 52 in longitudinal axial alignment with the jaws 28 and 30 of wire holding means 26 providing a guide for the front end of a wire (not shown) inserted within jaws 28 and 30 and extending into blade holder 48. Longitudinally aligned with aperture 52 remote from the concave portion 50 of blade holder 48 is the upper end 56 of a pivoting plate 54 (see FIGS. 13 and 14) pivotally responsive to the contact made therewith upon the insertion of the front end of a wire inserted within blade holder 48. The lower end 58 of plate 54 is disposed directly adjacent a switching mechanism 60 (see FIGS. 13 and 14) cooperable therewith and arranged to be actuated thereby. Each of a pair of cam engaging rollers 62, 64 is rotatably coupled to an associated second end 65 and 67, respectively, of stripping means 40 and is arranged to traverse an associated portion of a cam slot 66 in a third slide member 68 disposed adjacent stripping means 40 and generally rearward thereof, to the left of FIG. 1. As third slide member 68 is slidingly advanced forward (by means not shown), towards the upper right of FIG. 1, rollers 62 and 64 are caused to traverse their respective portions of slot 66, said rollers 62 and 64 being urged apart, thereby imparting a lateral movement to stripping means 40 in scissors-like fashion. For a complete description of the stripping means 40, reference is herein made to copending application Ser. No. 57,570, filed July 23, 1970 for a Stripping Apparatus by Harold Jesse Bush and assigned to the assignee of the instant invention. First slide member 22 is coupled between a pair of spaced, generally parallel, reciprocatingly actuable support members 70 and 72, the ends of each which are connected to opposing ends 74, 76 and 78, 80, respectively, of associated pneumatically actuated pistons 82 and 84, slidingly coupled to cylinders 87 and 89, respectively. It can be seen that the rightward displacement of pistons 82 and 84 will cause support members 70 and 72, and first slide member 22 attached thereto, to be correspondingly displaced, carrying with them wire holding means 26 attached to first slide member 22. As will be more fully described, first slide member 22 is activated sequentially subsequent to the activation of third side member 68, and upon the completion of the wire stripping operation resulting therefrom. Forward of the wire holding means 26 and in direct axial alignment therewith is an adjustable crimping means 86 comprising an upper head portion 88, a lower ram portion 90 and a pair of associated releasable die members 92 and 94, respectively. The lower ram portion 90 is hydraulically actuated by means of cylinder 93 as may be more clearly seen in FIG. 9. The lower ram portion 90 and the upper head portion 88 are attached to a first plate member 96 slidably coupled to a second plate member 98 intermediate a pair of upwardly facing, turned-in, parallel, spaced ends 100, 102, thereof, as may be more clearly seen in FIG. 2, permitting crimping means 86 to be laterally displaced as directionally indicated by arrow 104. The opposing, complementary, parallel, spaced pair of ends 106 and 108 of second plate member 98 are similarly turned in but face downwardly, the edges thereof slidably engaging adjacent edges 110 and 112 of angle bracket 114, attached to upright support members 118 and 120, permitting the displacement of crimping means 86 and first plate member 96 as directionally indicated by arrow 122 generally transverse to the displacement indicated by arrow 104. Lock member 124, extending upwardly from first plate member 96, towards the top of FIG. 2, is arranged to threadably engage second plate member 98, permitting members 96 and 98 to be securely locked together after an adjustment therebetween. A lever 126, shown in FIG. 2 as extending upwardly from first plate member 96 adjacent locking member 124, extends downwardly through a clearance hole 130 in first plate member 96 and a similar clearance hole (not shown) in second plate member 98, terminating in a ball joint coupling (not shown) attached to angle bracket 114. Thus, the bidirectional displacement of plate members 96 and 98 with respect to angle bracket 114 may be accomplished by the appropriate selective movement of lever 126. An adjusting rod 128 extending upwardly from first plate member 96 remote from locking member 124 threadably engages the protruding threaded end 134 (see FIG. 13) of rod 136 extending upwardly through plate members 96 and 98 through bushing 144. The opposing end 138 of rod 136 is pivotally coupled by means of a slot and pin arrangement to a first end 146 of an arm 140. The other end 148 of arm 140 is secured to upright member 118 by means of a ball joint coupling to permit the free lateral movement of arm 140 in response to the associated directional displacement of plate members 96 and 98. Arm 140 is additionally pinned to a bifurcated bracket 150 coupled to upright member 118 generally intermediate the first and second ends 146 and 148, respectively, of arm 140, restraining the vertical movement thereof, and permitting the vertical displacement of plate members 96 and 98 and the crimping means 86 affixed thereto in response to the selective displacement of rod 136, such movement being indicated by arrow 132 in FIG. 2.

Adjustably coupled to the upper head portion 88 of crimping means 86 is a wire guide 152 having a generally frustoconical aperture 154 therethrough, said aperture 154 converging towards the upper releasable crimping die member 92 and axially aligned with the longitudinal axis of wire holding means 26, for accurately guiding the stripped end of a wire into the wire receiving portion of a terminal disposed within the upper head portion 88 and the lower ram portion 90 of crimping means 86.

A U-shaped channel 156 extends through the upper and lower portions 88 and 90, respectively, of crimping means 86, providing a guide and support for a portion of a tape 158 on which are disposed a plurality of terminals 160 originating from a remote source (not shown) such as a reel or similar device. A reciprocating tape feed mechanism 162, to be described, is disposed below channel 156 and is arranged to intermittently and selectively advance tape 158 to transfer a terminal 160 towards and into the crimping zone positionally defined by crimping means 86. A first cover member 164 is hingedly coupled to the rear upstanding wall 166 of channel 156 forward of crimping means 86 to the right of FIG. 1, and extends thereacross, the front end 168 of cover 164 extending within an appropriately recessed portion 170 of the front upstanding wall 172 of channel 156. When closed, cover member 164 provides a partially restrictive slot between the underside thereof and the opposing adjacent surface of channel 156, to properly retain and guide tape 158 within channel 156, as tape 158 is advanced therethrough. A second cover member 174 is similarly hingedly coupled to rear wall 166 of channel 156 and is disposed on the opposing side of crimping means 86 to the left of FIG. 1, and extends across channel 156 in similar fashion to cover member 164, as shown. Coupled to cover member 174 and disposed within a cut out portion thereof is a slotted plate 176, the function of which is to be described with reference to FIG. 5 wherein the details thereof are more clearly shown. A pneumatic switching device 178, shown in FIG. 1 as mounted on a support plate 180, serves to directionally transfer a source of pressurized pneumatic fluid to the various actuating means in response to the actuation of cam operated valves (not shown) appropriately disposed within apparatus 20. By way of example only, a typical cam member 182 is shown coupled to first slide member support 70 adjacent the rear portion thereof. Each of a pair of rollers 184 and 186, extending outwardly from opposing sides of cam member 182, is arranged to contact its associated valve actuating plunger 188, 190, respectively, as support member 70 is advanced forwardly, to the upper right in FIG. 1, in response to the actuation of cylinder 86 and its associated piston 82, connected thereto.

Figure 4:
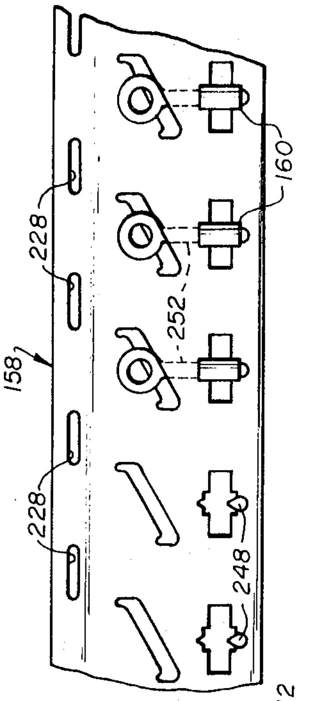
FIG. 4 is a top elevational view of a selectively apertured typical terminal tape as employed by the tape feed mechanism of FIG. 3.
Figure 3:
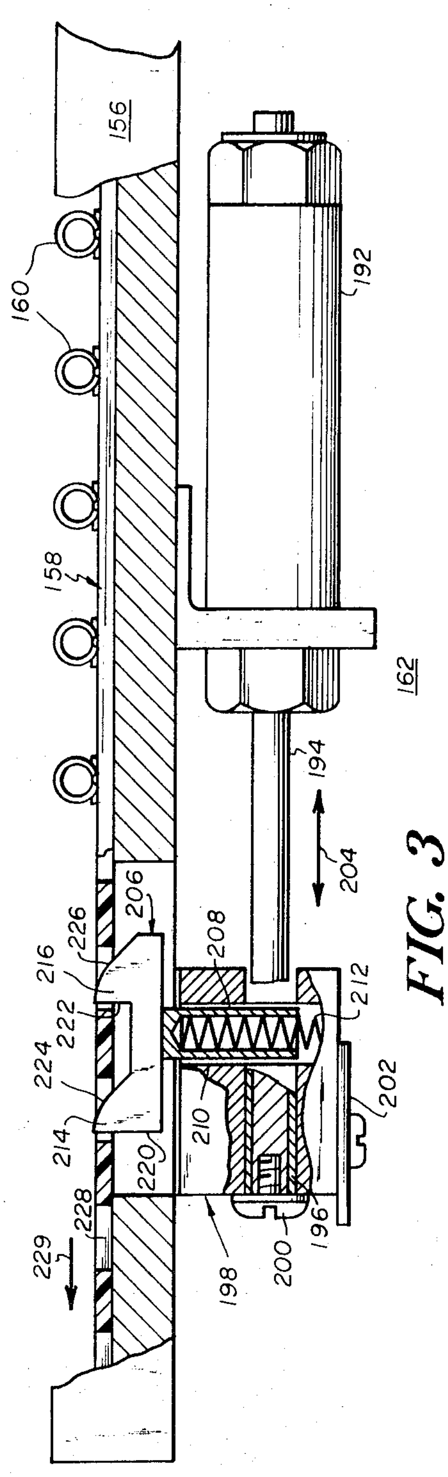
FIG. 3 is a front elevational view, partly in section, of a portion of the tape feed mechanism of the apparatus of FIG. 1.

Turning now to FIG. 3, there is shown the tape feed mechanism 162, of wire stripping and crimping apparatus 20, constructed in accordance with the concepts of the invention. Coupled to the underside of the terminal guide channel 156 is a pneumatically actuated cylinder 192 and associated piston 194 slidably cooperable therewith. The exposed end 196 of piston 194 extends through a tight fitting aperture in a slide member 198 and is secured thereto by means of a screw 200 threadably engaged with the internally threaded portion of the exposed end 196 of piston 194. Bracket 202 is coupled to channel 156 (in a manner not shown) and extends across the lower surface of slide member 198 providing a slide support therefore as slide member 198 is reciprocatingly displaced directionally as shown by arrow 204. Resiliently coupled to slide member 198 is a feed pawl 206 having a generally hollow depending portion 208 dimensioned to slidingly fit within aperture 210 in slide member 198. A compression spring member 212 is longitudinally disposed within depending portion 208 of pawl 206 and is secured to slide member 198 within aperture 210 as shown, biasing pawl 206 upwardly towards the top of FIG. 3. The upper portion of pawl 206 comprises a pair of spaced tooth-like projections 214 and 216, extending upwardly through a generally rectangular slot 218 in channel 156, as is more clearly seen in FIG. 8. Each of the projections 214 and 216 has a generally vertical forward edge 220 and 222, respectively, and a downwardly sloping trailing edge 224 and 226, respectively. As shown in FIG. 3, the tips of projections 214 and 216 extend through slot 218 in channel 156 and into adjacent slots 228 in tape 158 disposed within channel 156. As pawl 206 is moved forward towards the left of FIG. 3, upon the actuation of piston 194, and consequent displacement of slide member 198, each of the forward edges 220 and 222 of projections 214 and 216 bear against the adjacent surface of an associated slot 228 (shown in FIG. 4) in tape 158, advancing tape 158, towards the left of FIG. 3, as indicated by arrow 229 a predetermined distance governed by the length of stroke of piston 194. On the return stroke of piston 194, towards the right of FIG. 3, the sloping edge 224 and 226 of each of the projections 214 and 216, respectively, contacts the immediately adjacent surface of its associated slot 228 causing pawl 206 to be deflected downwardly, compressing spring 212, causing it to slide under tape 158 and engage another pair of slots 228 therein for the subsequent forward stroke of piston 194 and further advance of tape 158. As may be more clearly seen in FIG. 4, slots 228 in tape 158 are disposed in a generally regular spaced relationship adjacent one edge thereof, in conformance with the spacing between projections 214 and 216.

Figures 5, 6, 7:
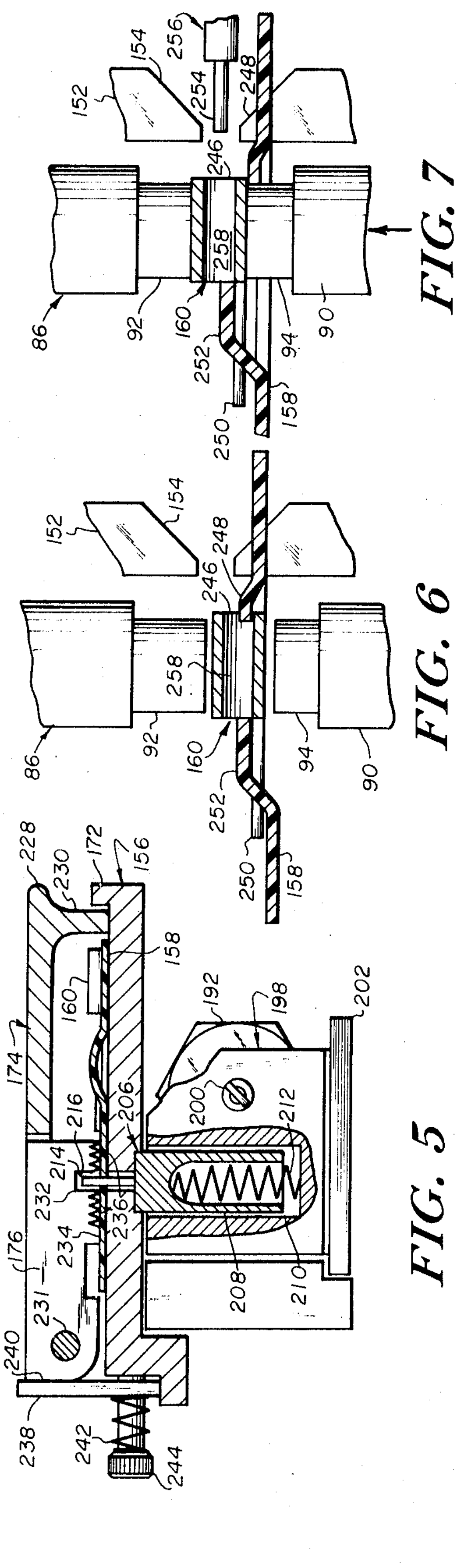
FIG. 5 is a side elevational view, partly in section, of the mechanism of FIG. 3.
FIG. 6 is a side elevational view, partly in section, of a portion of the crimping means of the apparatus of FIG. 1 including a terminal disposed between the upper and lower die portions thereof.
FIG. 7 is a side elevational view, partly in section, of the crimping means portion of FIG. 6, in a terminal holding state.

Turning now to FIG. 5, there is shown a more detailed view of second cover member 174. Extending downwardly from the forward edge 228 thereof, is a lip 230 arranged to seat within channel 156 inwardly of the forward wall 172 thereof, maintaining a predetermined aperture between the undersurface of cover 174 and the adjacent opposing surface of channel 156. Slotted plate 176, hingedly coupled to cover 174 by means of pin 231, is free to move relative to cover 174. A generally longitudinal slot 232 in plate 176 is so arranged as to permit the walls defining said slot 232 to encompass therebetween projections 214 and 216 of pawl 206 permitting the free reciprocating movement of pawl 206 within slot 232. The undersurface 234 of plate 176 directly adjacent slot 232 is selectively interrupted as at 236 in tooth-like fashion to provide increased frictional engagement between surface 234 and the directly adjacent portion of tape 158 disposed between surface 234 and channel 156. This feature is provided to prevent any backward displacement of tape 158 upon the return stroke of pawl 206. Plate 238 movably coupled to channel 156 adjacent rear wall 166 thereof extends upwardly therefrom and contacts the rear edge 240 of plate 176. A spring 242 compressively urged against plate 238 by means of screw 244 biases plate 238 against plate 176 resiliently retaining plate 176 and cover 174 in a closed position as shown.

Turning now to FIGS. 6 and 7, there is shown a typical insulated barrel terminal 160 interposed intermediate the upper die 92 and the lower die 94 of crimping means 86. As shown in FIG. 6, the wire receiving barrel portion 246 of terminal 160 is captured under lip 248 of tape 158, and the generally flat terminating portion 250 of terminal 160 is retained by the slot defined portion 252 of tape 158 prior to the crimping operation, terminal 160 being representative of a plurality of such terminals aligned in spaced parallel relationship along tape 158. Tape 158 is more fully described and claimed in U.S. Pat. No. 3,339,719 issued Sept. 5, 1967, to Harold J. Bush and assigned to the assignee of the instant invention. Prior to the initiation of the crimping cycle, the lower ram portion 90 of crimping means 86 is urged upwardly in response to a first holding force, displacing terminal 160 upwardly towards upper die 92 as the lower die 94 engages the adjacent surface of barrel 246. Lip 248 is thereby deflectingly deformed and is caused to snap out of engagement with barrel 246 whereby terminal 160 is retained on tape 158 solely by the slot defined portion 252 thereof, and is securely held in position between upper and lower dies 92 and 94, respectively, in reparation for the insertion of the stripped end 254 of insulated conductor 256 within barrel 246, the longitudinal wire receiving aperture 258 in barrel 246 axially aligned with aperture 154 in wire guide 152 directly adjacent thereto. As stripped end 254 of conductor 256 is selectively positioned within barrel 246 of terminal 160, a second crimping force is applied to ram 90, causing barrel 246 to be securely deformed about conductor end 254. As the force between upper and lower dies 92 and 94, respectively, attains a predetermined value, the hydraulic supply (not shown) to cylinder 93 is terminated causing ram 90 to return to its downwardly biased position, releasing terminal 160 and initiating the operation of the tape advance mechanism 162, whereby tape 158, now carrying a terminal and conductor assembly, is advanced one position removing the terminal and conductor assembly from the crimping zone and selectively positioning another terminal within dies 92 and 94.

Figure 8:
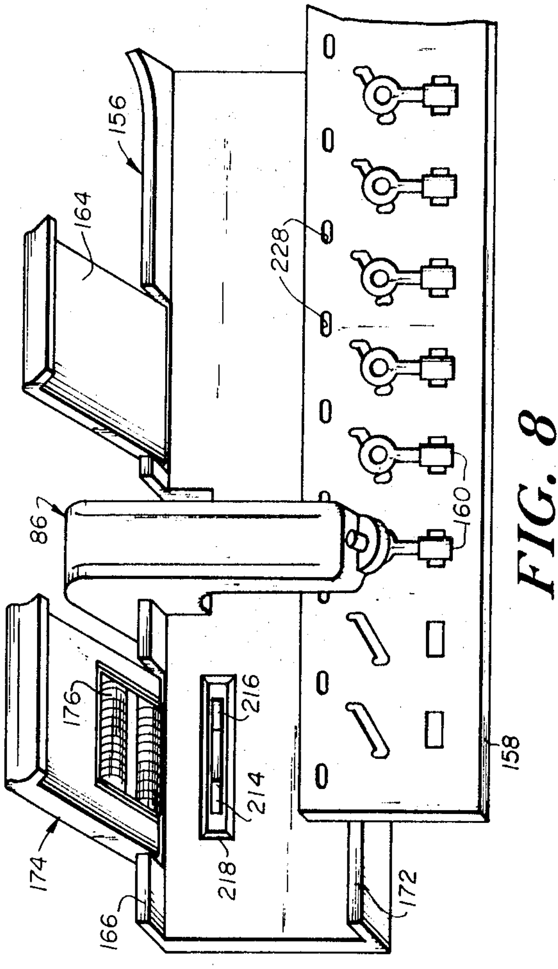
FIG. 8 is a top elevational view, partly in perspective, of a portion of the tape feed means of FIG. 1, including a portion of a typical terminal tape being laterally fed thereinto.

Turning now to FIG. 8, tape 158 is shown adjacent guide channel 156 prior to the insertion of tape 158 therein. Covers 164 and 174 are shown displaced upwardly providing an unobstructed opening for the convenient placement of tape 158 within channel 156 for the loading thereof, avoiding the necessity of having to tediously feed tape 158 through a restrictive slot or opening, as generally employed.

Figures 9, 10, 11:
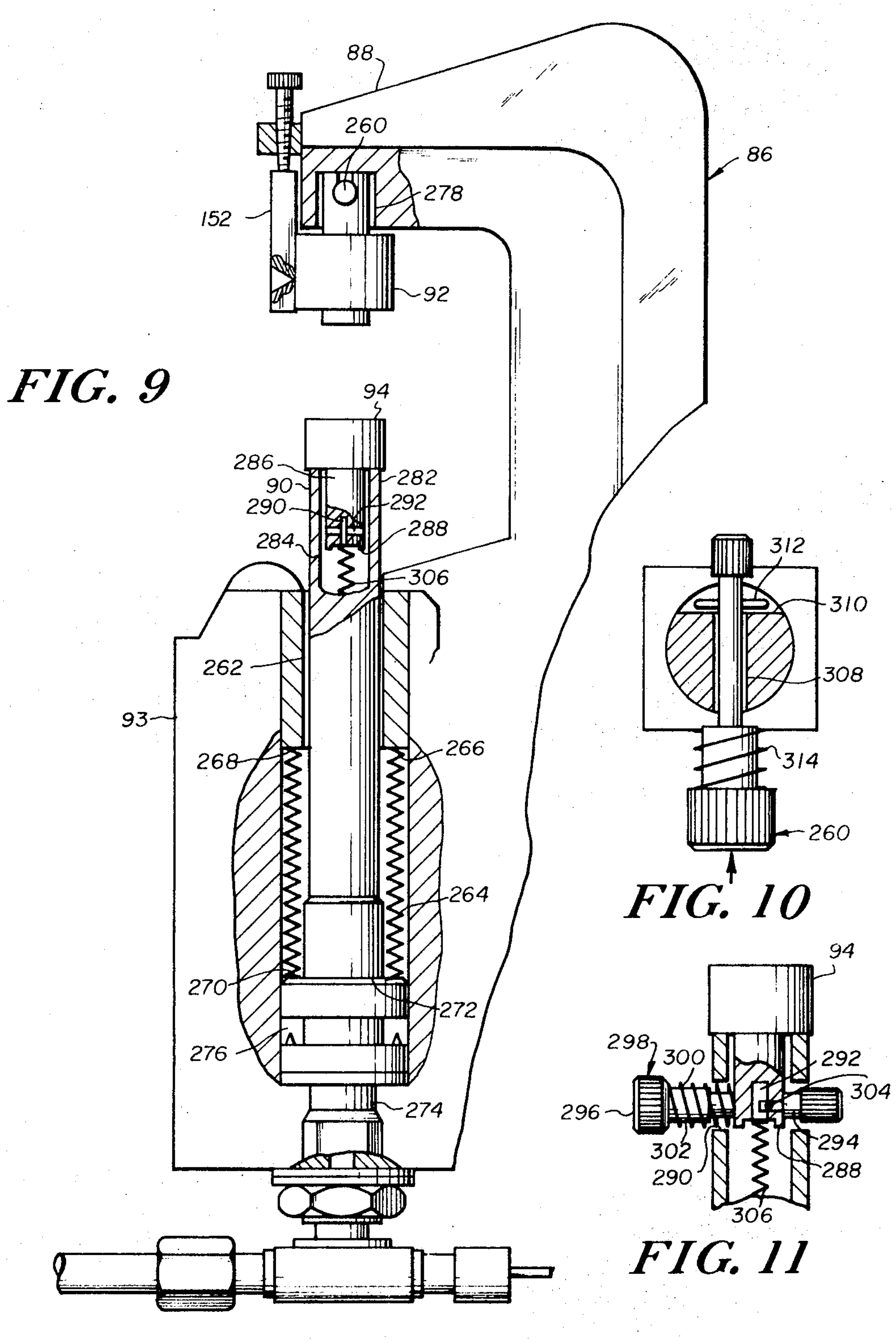
FIG. 9 is a side elevational view, partly in section, of the crimping means of the apparatus of FIG. 1, including the hydraulic actuating means coupled thereto.
FIG. 10 is a top plan view, partly in section, of the upper die release mechanism of the crimping means of FIG. 9.
FIG. 11 is a side elevational view, partly in section, of the lower die release mechanism of the crimping means of FIG. 9.

Referring now to FIGS. 9, 10 and 11, there are shown further details of crimping means 86 and the releasable upper and lower die members 92 and 94, respectively, constructed in accordance with the concepts of the invention. Ram 90 is slidingly disposed within a generally longitudinal aperture 262 in cylinder 93. Ram 90 is spring biased downwardly towards the bottom of aperture 262 by means of compression spring 264, the upper end 266 thereof abutting an adjacent shoulder portion 268 of aperture 262, and the lower end 270 thereof bearing against an adjacent shoulder portion 272 of ram 90. As hydraulic fluid is pumped into cylinder 93 through an orifice 274 filling a cavity 276 beneath ram 90, ram 90 is urged upwardly towards the top of FIG. 9 compressing spring 264. Upon the release of hydraulic pressure in response to pressure sensitive valve means (not shown) spring 264 tends to return ram 90 to its initial downward position in preparation for the next stroke. The protruding end 282 of ram 90 has a generally longitudinal aperture 284 therein dimensioned to provide a close fit about a cooperable depending portion 286 extending from one end of lower die 94. As is more clearly shown in FIG. 11, the free end 288 of extending portion 286 has a first and a second slot, 290, 292, respectively, therein in transverse axial alignment. Slide pin 298 has a generally flatted body portion 294 dimensioned to slidingly fit within slot 290, and an enlarged head portion 296 providing a convenient means for depressing pin 298 within slot 290. A spring 300 circumjacent the first shoulder portion 302 of pin 298 biases pin 298 circumferentially outwardly from ram 90 causing a pin 304 extending through a lateral aperture in body portion 294 of pin 298 to engage slot 292, thereby restraining die member 94 within aperture 284 in ram 90. Die member 94 may be released by depressing pin 298 inwardly, causing pin 304 to disengage from slot 292, whereby a helical spring 306, bearing against the slotted end 288 of die 94, urges said die 94 upwardly and out of engagement with aperture 284. The upper die member 92 is similarly constructed, as may be seen in FIG. 10, wherein slots 308 and 310, slide pin 260, transverse pin 304 and biasing spring 314 perform essentially the same function as described above with respect to portions 290, 292, 298, 304 and 300 of FIG. 11.

Figure 15:
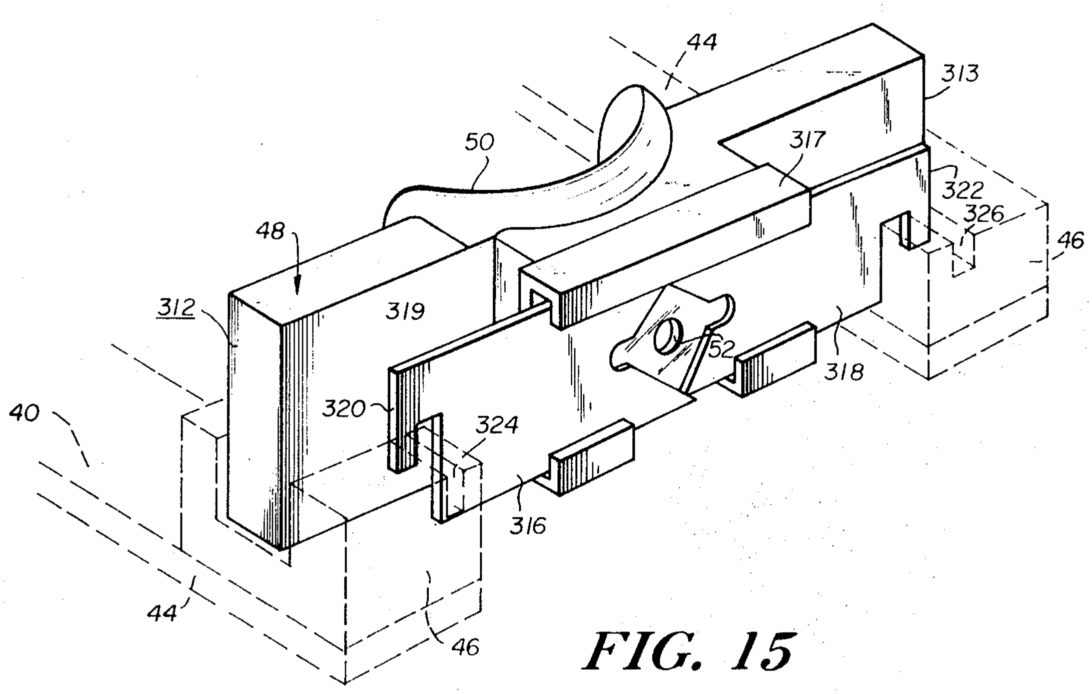
FIG. 15 is a perspective view of the cutter blades and associated holder of the apparatus of FIG. 1.
Figure 16:
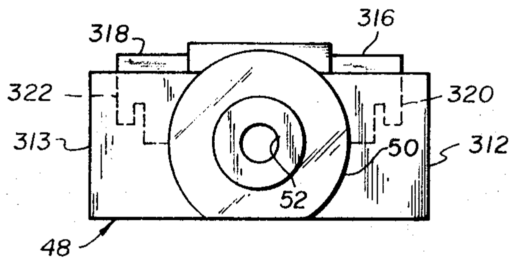
FIG. 16 is a front elevational view of the device of FIG. 15.

Referring now to FIGS. 15 and 16, blade holder 48 is shown in greater detail. The opposing ends 312 and 313 of holder 48 are slidingly retained within appropriately slotted members 46 adjacent the first ends 44 of stripping mechanism 40. A pair of cutter blades 316, 318, each having a generally V-shaped cutting edge, and in overlapping opposing complementary disposition, are slidingly retained within a channel 317 adjacent the rear surface 319 of holder 48. A hook-like projection 320, 322 adjacent the free end of each blade 316, 318, respectively, engages an associated slot 324, 326 in members 46 whereby blades 316 and 318 may be reciprocatingly operated towards and away from the insulation adjacent a predetermined length of insulated conductor intermediate said blades 316, 318 in response to the scissors-like movement of members 46, thus severing the insulation adjacent the cutting edges thereof.

Figure 13:
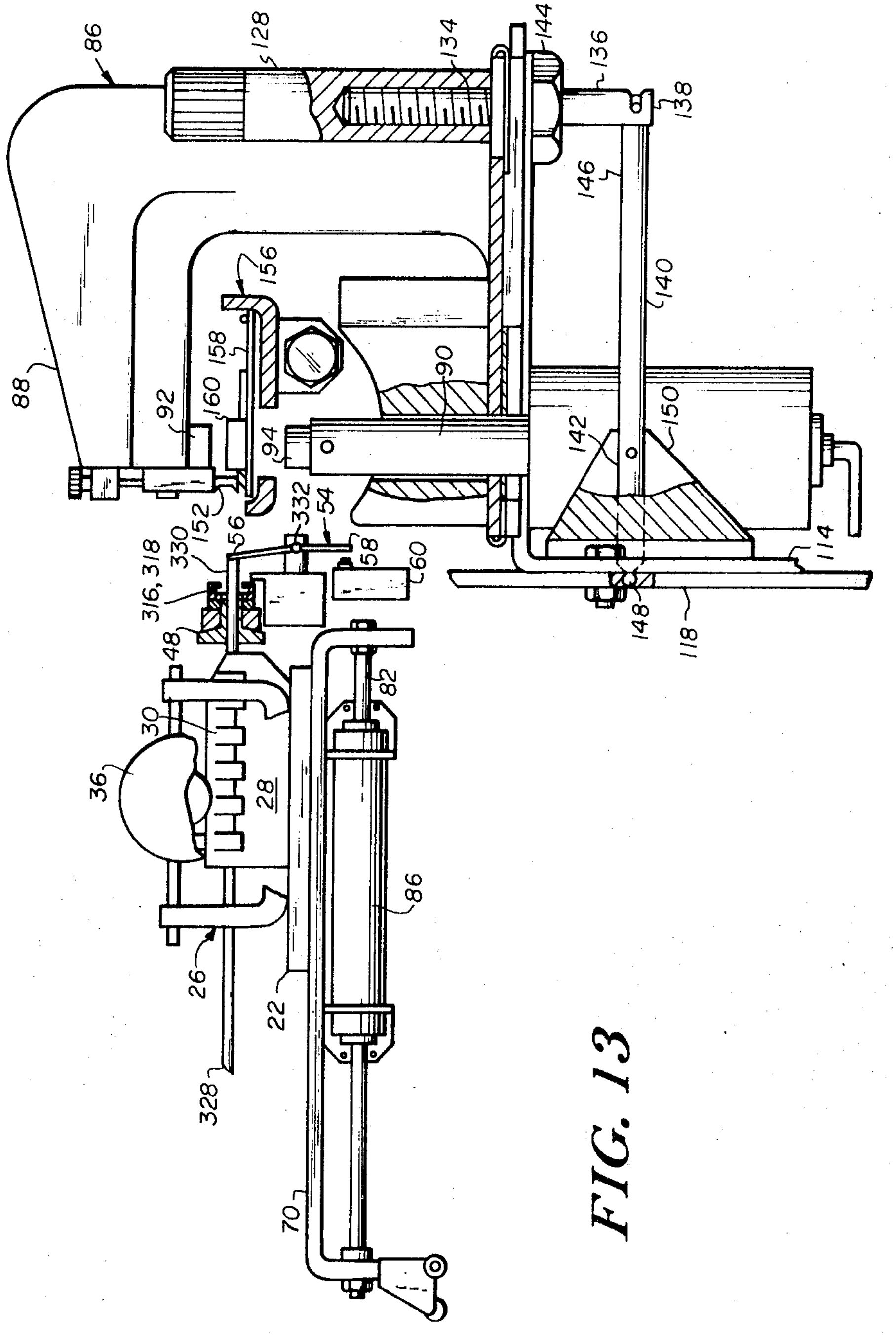
FIG. 13 is a side elevational view, partly in section, of the stripping and crimping mechanism of the apparatus of FIG. 1.
Figure 14:
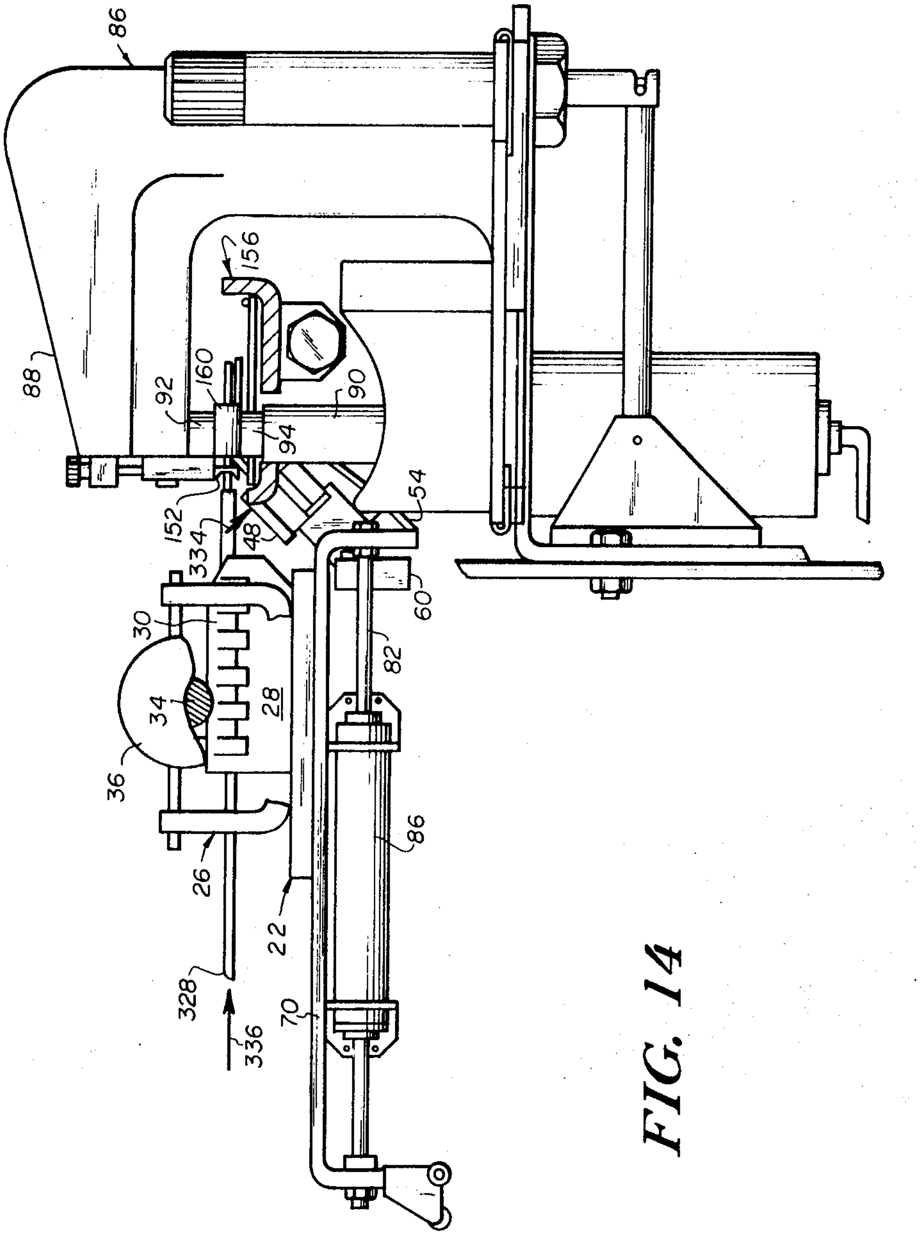
FIG. 14 is a view, similar to FIG. 13, of the apparatus of FIG. 1 in an advanced state of operation.

Turning now to FIG. 13, first slide member 22 is shown in its rearward position preparatory to the stripping operation. The leading end 330 of a predetermined length of insulated conductor 328 securely held within the jaws 28, 30 of wire holding means 26 is sown extending through blade holder 48 and terminating between the cutter blades 316, 318 and contacting the upper end 56 of detecting plate 54, causing plate 54 to pivot about pin 332, the lower end 58 of plate 54 contacting switching means 60, initiating the stripping cycle. As blades 316, 318 close selectively about conductor 328, the insulation adjacent thereto is severed. Slide member 22 is then linearly advanced as indicated by arrow 336 in FIG. 14, causing stripping means 40 including blade holder 48 to be planarly rotated out of the stripping zone, blades 316, 318 causing the portion of insulation previously severed from conductor 328 to be removed therefrom and transferred downwardly with blade holder 48 directionally as indicated by arrow 334. Conductor 328 is then unobstructedly linearly transferred in a single direct path towards wire guide 152 and crimping means 86, as ram 90 is activated, positioning terminal 16 in direct axial alignment with conductor 328, as described above.

The embodiments of the invention in which an exclusive property or privilege is claimed are defined as follows:

I claim:

1. A stripping and crimping apparatus comprising: a crimping zone; crimping means in said crimping zone; a stripping zone in direct linear alignment with said crimping zone and spaced apart therefrom; stripping means comprising a pair of laterally operable adjoining cutter blades in said stripping zone in direct linear alignment with said crimping zone and movable towards and away from said stripping zone; wire holding means adjacent said stripping means in direct linear alignment with said crimping means and reciprocatingly operable in a single linear path including said stripping zone and said crimping zone; and actuating means for reciprocatingly transferring said wire holding means in such direct linear path, whereby a predetermined length of wire disposed within said wire holding means may have a selective portion of insulation stripped from one end thereof and said wire unobstructively transferred in said single linear path from said stripping zone to said crimping zone as said stripping means is removed from said stripping zone.

2. A stripping and crimping apparatus as defined in claim 1 further comprising terminal guide means generally adjacent said crimping means for positionally directing a plurality of terminals towards said crimping zone.

3. A stripping and crimping apparatus as defined in claim 2 further comprising reciprocatingly operable terminal advance means adjacent said terminal guide means for advancing a plurality of releasably attached terminals disposed in said terminal guide means.

4. A stripping and crimping apparatus as defined in claim 3 wherein said terminal advance means comprises a pawl member adjacent said terminal guide means and slidable with respect thereto.

5. A stripping and crimping apparatus as defined in claim 4 further comprising reciprocatingly movable support means adjacent said terminal guide means; and resilient coupling means coupling said pawl member to said support means, wherein said pawl member is resiliently displaceable axially transverse to said reciprocating movement of said support means.

6. A stripping and crimping apparatus as defined in claim 2 wherein said terminal guide means comprises a terminal support portion having a pair of spaced apart upstanding sides and a web portion therebetween.

7. A stripping and crimping apparatus as defined in claim 6 further comprising a cover portion movably coupled to said terminal support portion generally intermediate said upstanding sides thereof forming an at least partially restrictive aperture between said cover portion and said web portion.

8. A stripping and crimping apparatus as defined in claim 1 wherein said wire holding means comprises a pair of complementarily contoured jaws at least one of which is movable towards and away from the other.

9. A stripping and crimping apparatus as defined in claim 1 further comprising means coupled to said crimping means for selectively positioning said crimping means relative to said stripping means.

10. A stripping and crimping apparatus as defined in claim 9 wherein said positioning means comprises a pair of transversely slidable members in adjacent cooperable overlapping relationship.

11. A stripping and crimping apparatus as defined in claim 1 further comprising detecting means adjacent said stripping means responsive to the presence of a conductor selectively disposed therein.

12. A stripping and crimping apparatus as defined in claim 11 wherein said detecting means is pivotally coupled to said stripping means.

13. A stripping and crimping apparatus as defined in claim 1 further comprising reciprocating drive means operatively coupled to said stripping means to effect the movement thereof towards and away from said stripping zone.

14. A stripping and crimping apparatus as defined in claim 13 wherein said drive means comprises cam means; and said stripping means comprises cam engaging means secured thereto and cooperably engageable with said cam means.

15. A stripping and crimping apparatus as defined in claim 1 wherein said crimping means comprises a head portion; a ram portion; and a pair of die members; one of said die members being coupled to said head portion and the other of said die members being coupled to said ram portion.

16. A stripping and crimping apparatus as defined in claim 15 further comprising dual-pressure actuating means operatively coupled to said crimping means for selectively applying a first predetermined holding force and a second predetermined crimping force between said head portion and said ram portion of said crimping means.

17. A stripping and crimping apparatus as defined in claim 1 wherein said stripping means is planarly rotatable towards and away from said stripping zone.

18. A stripping and crimping apparatus as defined in claim 18 wherein said stripping means comprises a pair of laterally operable adjoining cutter blades movably coupled to a first end thereof, for severing the insulation circumjacent a selective portion of an insulated conductor disposed intermediate said cutter blades.

19. A stripping and crimping apparatus as defined in claim 18 wherein said stripping means further comprises retention means pivotally coupled to said first end thereof and arranged to receive therein said cutter blades.

20. A stripping and crimping apparatus as defined in claim 17 further comprising drive means having cam means thereon, and wherein said stripping means comprises cam engaging means secured thereto and cooperably engageable with said cam means.

21. A stripping and crimping apparatus as defined in claim 1 wherein said stripping means comprises a pair of laterally operable adjoining cutter blades movably coupled to a first end thereof, for severing the insulation circumjacent a selective portion of an insulated conductor disposed intermediate said cutter blades.

22. A stripping and crimping apparatus as defined in claim 21 wherein said stripping means further comprises retention means movably coupled to said first end thereof and arranged to receive therein said cutter blades.

23. A stripping and crimping apparatus as defined in claim 1 further comprising dual-pressure actuating means operatively coupled to said crimping means for selectively applying a first predetermined holding force and a second predetermined crimping force to said crimping means.

* * * * *